E. SCHLAG.
Agricultural Implement.

No. 217,491. Patented July 15, 1879.

Witnesses
G. R. Hoffman
N. Cowles

Inventor
Edward Schlag
By Gridley & Co.
Attys.

UNITED STATES PATENT OFFICE.

EDWARD SCHLAG, OF CHICAGO, ILLINOIS.

IMPROVEMENT IN AGRICULTURAL IMPLEMENTS.

Specification forming part of Letters Patent No. 217,491, dated July 15, 1879; application filed January 10, 1879.

*To all whom it may concern:*

Be it known that I, EDWARD SCHLAG, of Chicago, in the county of Cook and State of Illinois, have invented new and useful Improvements in Agricultural Implements, of which the following is a full, clear, and exact description thereof, which will enable others skilled in the art to which my invention appertains to make and use the same, reference being had to the accompanying drawings, forming part hereof, and in which—

Figure 1:
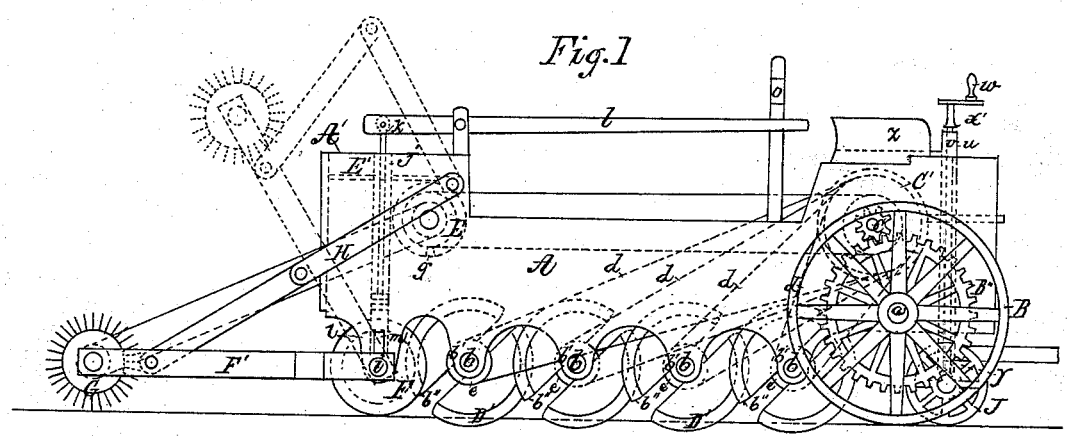
Figure 2:
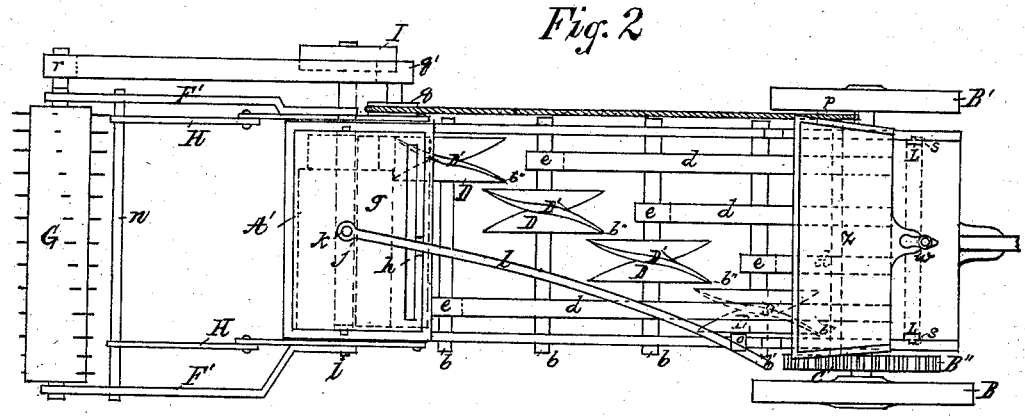
Figure 3:

Figure 1 represents a side elevation of an agricultural implement embodying my invention, and Fig. 2 represents a plan or top view of the same. Fig. 3 represents a vertical section of the plow-cutter as attached to the plow.

Like letters of reference indicate like parts.

The object of my invention is to facilitate the tilling and cultivation of the soil; and my invention consists in the construction and combination of the various parts, hereinafter more fully described and claimed.

In the drawings, A represents the frame or bed, preferably constructed in the form shown, but may be made in any suitable form, so as to receive the operating parts. A′ is an upward-projecting compartment or receptacle, forming the seed-box, as hereinafter more fully described.

B B′ are the driving-wheels, firmly mounted upon axle $a$, one of said wheels being less in diameter than the other, the smaller traveling on the unplowed ground, while the larger travels in the last-made furrow, thus guiding the implement.

B″ is a cog-wheel, firmly mounted upon the axle $a$ between the frame A and driving-wheel B, and rotates in unison with the latter. C is a pinion which engages cog-wheel B″, and is firmly mounted upon the shaft with pulleys C′.

D D represent a series of rotary plows or cultivators, made of any suitable metal, in the form of a spiral or screw of only one convolution, and to the sides of the outer ends thereof are attached cutters D′, which project at right angles with the thread or blade, and as the plows are rotated the cutting-edges $b''$ take into and break up the soil. These plows D are firmly mounted upon shafts $b$, the latter being properly journaled within depending lugs or hangers $b'$ on either side of the frame A, and are arranged obliquely, as shown.

$d$ are belts connecting pulleys $e$ with pulleys C′, respectively. E is the seed-cylinder, mounted firmly upon a shaft provided with suitable journals. This cylinder is provided with a line of oblong receptacles or pockets, $g$, extending longitudinally with the length of the cylinder.

E′ is a horizontal diaphragm, located any suitable distance below the top of the projecting compartment A′, and immediately above the rotating seed-cylinder E, and so as to form a receptacle for the seed to be used. This diaphragm E′ is provided with an oblong aperture or slot, $h$, in length corresponding with the line of oblong receptacles, and is in a vertical plane with the axis of the cylinder E.

F is a surface-roller, which presents sufficient bearing to prevent the rear portion of the frame or bed from sinking too deep into the soft plowed ground. This surface-roller F is provided with a suitable spindle, $i'$, which extends through slots $m$, formed in the depending lugs $l'$ and beyond the frame A, and is journaled to a vertical sliding frame, $j$, and by means of a vertical connected rod, $k$, and horizontal lever $l$, the roller F can be raised or lowered, as desired, by which means the depth of cut of the rear plows is regulated.

F′ is the frame supporting the harrow G, the ends of which are pivoted to the ends of the harrow and to the projecting roller-spindle $i$, respectively.

G is a rotary harrow pivoted to frame F′, and in such a manner that it may be folded or raised from the ground when not in use, as shown by dotted lines in drawings.

H H are knuckle-jointed braces, the ends of which are pivoted to cross-bar $n$ of the harrow-frame F′ and to the sides of the frame A, respectively, and are for the purpose of holding in position the harrow-frame F′, and harrow G when the latter is in operation.

$o$ is a notched upright, and is for the purpose of holding in position the lever $l$.

$p$ is a pulley rotating in unison with the pulleys C', and is connected by means of a belt with pulley $q$, which rotates seed-cylinder E.

$q'$ is a pulley rotating with cylinder E, and is by means of a belt connected with pulley $r$. The latter pulley rotates the harrow G.

I is a guide-wheel, and is for the purpose of guiding the rear portion of the implement and travels on the unplowed ground.

$s$ is a square frame, the lower end resting on the truck-bolster $y$, and the sides of which are so constructed as to slide vertically within the groove L, constructed in the inner surfaces of frame A.

J are trucks pivoted to the vertical sliding frame $s$, and in such a manner that the trucks can be raised and lowered at will by turning the crank $w$.

$u$ is a vertical spindle, the lower end of which is screw-threaded and passes through the frame $s$ and bolster $y$. The upper end of the spindle $u$ is journaled within a suitable journal-box, $v$, which is permanently attached to the seat, as shown, and is also provided with shoulders $x'$, so as to prevent the spindle $u$ from moving vertically.

My implement is drawn by horse-power. The rotation of the driving-wheels B B' causes the rotation in unison of the cog-wheel B''. This engages pinion C, causing the rotation in the opposite direction of pulleys C'. These latter pulleys, by means of belts $d$, rotate the plows D in a reverse direction to that traveled by the driving-wheels B B'. The plows are set or lapped so that each encroaches on the furrow cut by the other, thus plowing a surface in width corresponding with the inner width of the frame or bed A.

By means of pulley $q$, which has a belt-connection with pulley $p$, the seed-cylinder is rotated, and the seed which is contained in the receptacle A' falls through the oblong aperture $h$ in the diaphragm E', and rests on the surface of the seed-cylinder until by the rotation of the latter the receptacles or pockets $g$ are brought immediately underneath the oblong aperture $h$, when the seed drops into the pockets $g$ of the seed-cylinder, and is carried around until it falls by its own gravity to the ground, when the soil is again manipulated by the revolving harrow G, which is rotated by a belt-connection with cylinder-pulley $q'$ and harrow-pulley $r$.

Having plowed, planted, and harrowed the desired length or distance, the crank $w$ of the vertical spindle $u$ is turned to the left, and the horizontal lever $l$ is placed into the uppermost notch of the upright $o$, thereby causing the driving-wheels B B' and the plows D to be raised off the ground, and allowing the front part of the frame to rest on the bolster $y$ on the trucks J. By this means the implement may be made to turn a sharp corner.

By means of the knuckle-jointed braces H H the harrow can be held in an elevated position.

Having thus described my invention, what I claim as new, and desire to secure by Letters Patent, is—

1. The rotary plow or cultivator D, made in the form of a spiral or screw of only one convolution, and provided with the cutter D', substantially as shown and described.

2. The combination, with the frame A, of a series of rotary plows, D, each made in the form of a spiral or screw of only one convolution, arranged obliquely, and provided with the cutter D', substantially as shown and described.

3. The combination, with the frame A, trucks J, frame $s$, vertical spindle $u$, crank $m$, of the driving-wheels B B', pulleys C', and plows D, substantially as and for the purpose specified.

4. The roller F and guide-wheel I, journaled upon the shaft $i$, in combination with the vertical sliding frame $j$, rod $k$, and lever $l$, substantially as shown and described.

EDWARD SCHLAG.

Witnesses:
  G. R. HOFFMAN,
  N. COWLES.